United States Patent [19]
Gunkel

[11] 3,741,003
[45] June 26, 1973

[54] ULTRASONIC INSPECTION APPARATUS

[76] Inventor: Walter A. Gunkel, 6515 Moss Oak, San Antonio, Tex. 78229

[22] Filed: Feb. 22, 1971

[21] Appl. No.: 117,677

[52] U.S. Cl................................. 73/67.7, 73/71.5 U
[51] Int. Cl............................................. G01n 29/04
[58] Field of Search.................. 73/67.7, 67.8, 67.9, 73/71.5; 310/8.7

[56] References Cited
UNITED STATES PATENTS

| | | | |
|---|---|---|---|
| 3,019,637 | 2/1962 | Cook et al. | 73/67.7 |
| 2,875,607 | 3/1959 | Boxcer et al. | 73/67.9 |
| 3,393,331 | 7/1968 | Puckett | 310/8.3 |
| 3,248,933 | 5/1966 | Stebbins | 73/71.5 |
| 2,460,153 | 1/1949 | Smoluchowski | 73/71.5 X |

FOREIGN PATENTS OR APPLICATIONS

| | | | |
|---|---|---|---|
| 255,105 | 2/1963 | Australia | 73/71.5 |

Primary Examiner—Richard C. Queisser
Assistant Examiner—John P. Beauchamp
Attorney—Hyer, Eickenroht, Thompson & Turner

[57] ABSTRACT

Ultrasonic inspection apparatus is disclosed in which a plurality of transducers may be employed in a transducer housing assembly to permit simultaneous inspection of a plurality of adjacent sections of the object being inspected, for example, adjacent contiguous circumferential bands of a tubular member. The transducers are preferably mounted in the housing assembly in a manner which permits limited canting of each of the transducers. Also, a transducer is disclosed which includes an acoustical coupling fluid injection means which assures good acoustical coupling and can provide a fluid bearing system for the transducer.

15 Claims, 6 Drawing Figures

3,741,003
PATENTED JUN 26 1973
SHEET 1 OF 2
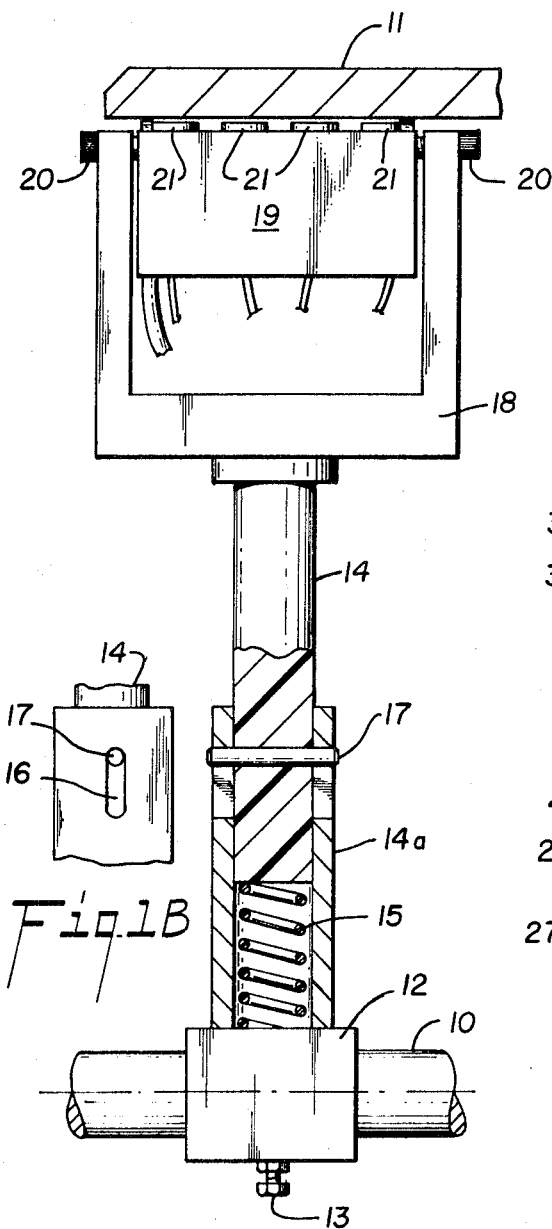
Fig. 1A
Fig. 1B
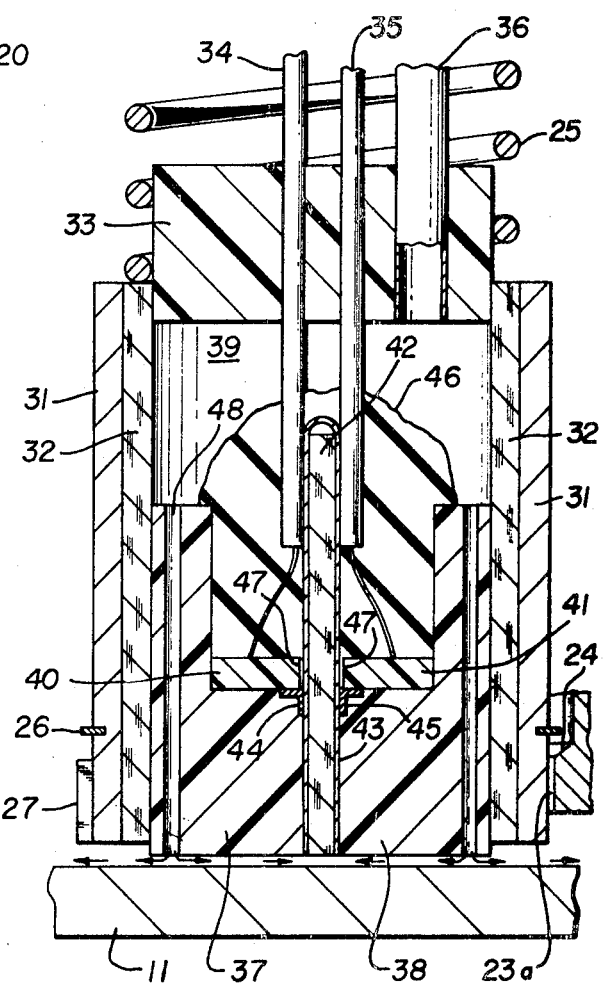
Fig. 2
WALTER A. GUNKEL
INVENTOR.
BY Hyer, Eickenroht
Thompson + Turner
ATTORNEYS

WALTER A. GUNKEL
INVENTOR.

BY Hyer, Eickenroht,
Thompson + Turner

ATTORNEYS

ULTRASONIC INSPECTION APPARATUS

This invention relates to an ultrasonic inspection apparatus and in one of its aspects to a transducer assembly for use in ultrasonic inspection. A further aspect of the invention relates to an acoustical coupling fluid system for use with such a transducer assembly, and an improved ultrasonic transducer which may employ such a system.

In ultrasonic inspection of metal objects, a transducer such as a piezoelectric crystal may be employed to transmit an ultrasonic signal into the object to be inspected and to receive back an echo signal from this object which bears certain information concerning a condition, such as the wall thickness, of the object being inspected. Because of the small amplitude of signals employed in ultrasonic inspection and the rapid time base employed, accurate positioning or alignment of the transducer with respect to the object being inspected is necessary, or the echo signal may be attenuated or lost. In many past systems, as the transducer is being passed over the object being inspected, it is generally rigidly fixed at a small distance from the object to be inspected, and this fixed alignment may result in faulty indications when the surface of an object being inspected varies thus changing the spacing between the transducer and the object. Also, an acoustical coupling medium, such as water or oil, is generally injected into the clearance between the transducer and the object being inspected. Since it is conventional to rely on a fixed clearance between the transducer and the object being inspected, a bump or other change on the surface of the object being inspected, which may take up this clearance, may displace the coupling medium and cause loss of acoustical coupling.

The coupling medium is necessary in order to provide good acoustical coupling between the transducer and the object being inspected because air is a poor acoustical conductor. In past systems a fluid coupling medium is generally smeared, poured, or sprayed on the surface of the work piece before the transducer is utilized. Serious disadvantages result from these types of fluid application, since the coupling mediums may run from the surface, may evaporate, may penetrate the surface of the body, or otherwise produce a poor and inefficient coupling medium. Also, the conventional practice in the use of coupling agents provides a further disadvantage in that they require a separate operation to place the fluid coupling medium on the surface of the body being inspected.

It is thus an object of this invention to provide an improved ultrasonic inspection apparatus in which problems of alignment of the transducers with respect to the surface of the object being inspected are minimized.

Another object of this invention is to provide an ultrasonic transducer including an acoustical coupling medium injection system to provide a continuous effective coupling between the transducer and the surface of the object being inspected.

Another object of this invention is to provide an ultrasonic transducer including such an acoustical coupling medium injection system which provides a fluid bearing for the transducer as well as the coupling medium.

Another object of this invention is to provide an improved ultrasonic transducer which has relatively stable acoustical coupling properties over a relatively large range of temperatures and which may be self-contained.

Another object of this invention is to provide an ultrasonic transducer including separate sections for transmitting and receiving acoustical signals, and in which improved acoustical shielding between the sections is provided.

These and other objects of this invention are accomplished by providing for the mounting of one or more transducers in a housing assembly to permit limited canting movement of the transducer in all directions in response to changes in the surface of the object being inspected to maintain proper alignment. Also, the transducers are preferably mounted so that they are urged against the object being inspected by a resilient force.

A further aspect of this invention is the provision of a self-contained transducer which includes one or more fluid orifices communicating with a source of acoustical coupling fluid for injecting the acoustical coupling fluid between the transducer and the object being inspected to provide a substantially uniform film of coupling fluid on the surface of the object being inspected. By control of the fluid pressure from the transducer, in combination with the resilient mounting of the transducer, a layer of coupling fluid of substantially uniform thickness can be provided to improve acoustical coupling and provide a fluid bearing for the transducer.

Also, the acoustical coupling properties of the transducer of this invention are greatly improved by use of glass impregnated epoxy to provide acoustical coupling between the transducer elements and the exterior of the transducer.

In the drawings, wherein like numerals are used throughout to designate like parts:

FIG. 1A is an elevational view of the preferred form of the apparatus of this invention mounted on a rotatable shaft in a tubular member being inspected;

FIG. 1B is a side view of a portion of the apparatus of FIG. 1A;

FIG. 2 is a sectional view through the longitudinal axis of the preferred form of ultrasonic transducer of this invention;

Figure 3:
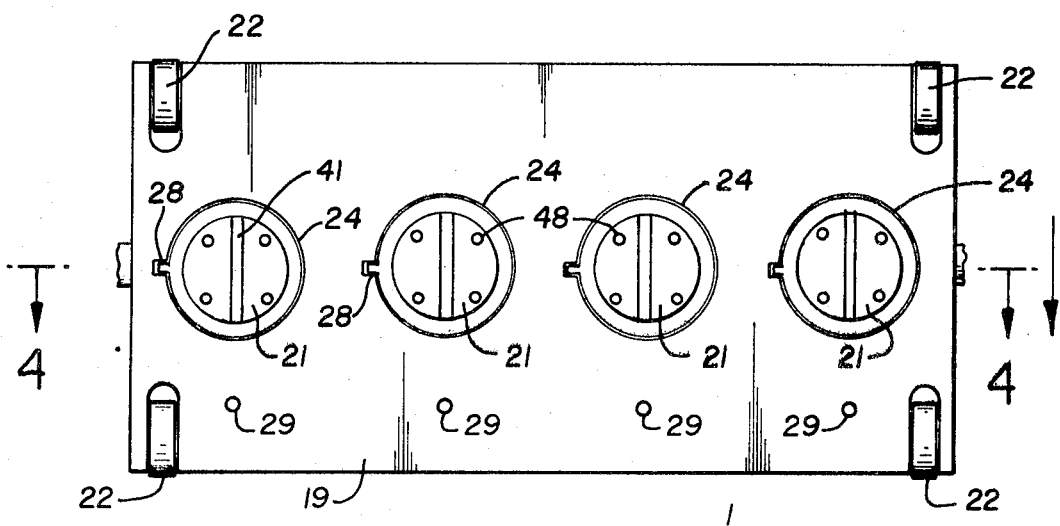
FIG. 3 is a bottom view of a preferred form of transducer housing assembly used in the apparatus of FIG. 1A.

Referring to the drawings, wherein the preferred embodiments of this invention are illustrated, the ultrasonic inspection apparatus of this invention is illustrated as incorporated in an ultrasonic inspection system for inspecting large diameter tubular members. However, the transducer of this invention and the principles employed in its mounting and the use of acoustical coupling medium may also be used in other ultrasonic inspection applications.

FIG. 1A illustrates a supporting mechanism for supporting the transducer housing assembly of this invention in a large diameter pipe. A shaft 10 is illustrated as being supported along the longitudinal axis of a member or pipe 11 being inspected by the ultrasonic inspection apparatus of this invention. One suitable means for supporting shaft 10 is the device illustrated in the copending application of Carl Smith, Ser. No. 117,657, filed Feb. 22, 1971, entitled "Device for Supporting a Rotating Shaft Within an Opening in Another Member", assigned to the applicant of this application. A hub 12 is mounted on shaft 10 and rotates with the shaft, and its position along the length of shaft 10 can be adjusted by setscrew 13. A hollow member 14a is mounted on hub 12, and an arm 14 telescopes into member 14a and is supported on a spring 15 so that as the arm 14 is pushed toward hub 12, it is urged in the opposite direction by spring 15. The compressing force of spring 15 should be sufficient so that when arm 14 is in a vertical position the weight of arm 14 and the apparatus attached to it does not exceed the force of the spring. As illustrated in FIG. 1B, a slot 16 can be provided in member 14a and a pin 17 passed through arm 14 to prevent arm 14 from being inadvertently pulled out of member 14a and also to provide a stop for the movement of arm 14 relative to member 14a.

The other end of arm 14 carries a yoke 18 on which is mounted a transducer housing assembly 19. Transducer housing assembly 19 is preferably pivotally mounted on yoke 18 by screws 20 so that as arm 14 is rotated about member 11, housing assembly 19 may cock to follow the contour of the inside diameter of pipe 11. A plurality of transducers 21, illustrated in the example as four in number, are mounted in housing 19 and are positioned in housing 21 so that they are against the inside wall of member 11 as the assembly is rotated by shaft 10 along the circumference of the inner wall of member 11.

Figure 4:
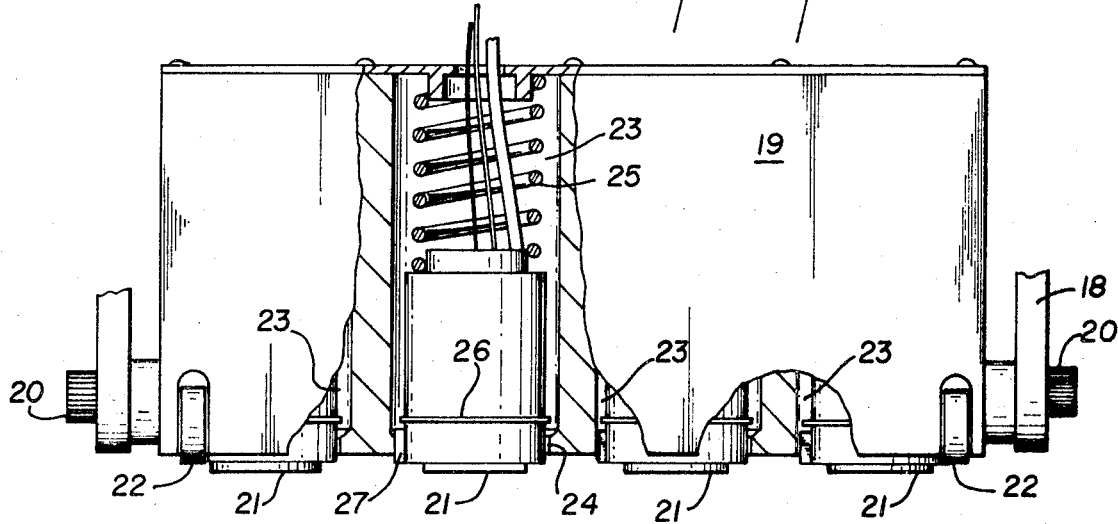
FIG. 4 is a side view of the transducer housing assembly of FIG. 3 and includes a section showing the mounting of one of the transducers in the housing assembly.

As illustrated in FIG. 3, transducer housing assembly 19 is a box-like structure made of, for example, aluminum and includes a plurality of wheels 22 at each of its corners to permit it to be rolled about the circumference of the inner wall of member 11. Housing 19 is thus held against the inner wall of pipe 11 on wheels 22 by the force of spring 15. Each of transducers 21 are mounted in adjacent chambers 23 in housing 19, as illustrated in FIG. 4. The mounting illustrated in FIGS. 3 and 4 provides an arrangement where each of the transducers 21 are mounted in line so that as housing 19 is rotated along the inner wall of member 11, adjacent circumferential bands of member 11 can be simultaneously inspected. This arrangement has particular application in the ultrasonic inspection system disclosed by my copending patent application entitled "Ultrasonic Inspection System", filed Ser. No. 117,676, filed Feb. 22, 1971.

Each of transducers 21 is preferably mounted in its respective chamber 23 in a manner which permits limited canting movement of the transducer in substantially all directions. As illustrated in FIGS. 3 and 4, a lip 24 is provided on housing 19 about the opening through which transducer 21 passes, and a sufficient clearance 23a between each of the transducers and lip 24 is provided to permit the transducers to have this canting ability. Also, each of the transducers is resiliently mounted in each of its respective chambers 23 by a spring 25 which provides a force which urges the transducers out of chamber 23 and toward the object to be inspected. However, each of the transducers has a snap ring 26 located on its outer periphery, and lip 24 cooperates with snap ring 26 to provide a stop which prevents the transducers from falling from chambers 23. The force of spring 25 is sufficiently small so that it imparts only a vertical force against transducer 21 and does not provide lateral forces which would inhibit the ability of transducer 21 to cant about the lower lip 24 when the need arises. Also, a guide lug 27 may be provided on the lower end of each of transducers 21 to cooperate with a slot 28 in lip 24.

Under the urging of spring 25 and when snap ring 26 is against lip 24, the end of transducer 21 extending from housing 19 extends further out than the extent of wheels 22, so that as housing 19 is rolled along the surface of an object being inspected, transducers 21 will be urged against and will contact this surface. However, as bumps and the like in the surface are encountered, transducer 21 will move against the urging of spring 25 and, if necessary, cant to remain in substantial alignment with the surface being inspected.

Figure 5:
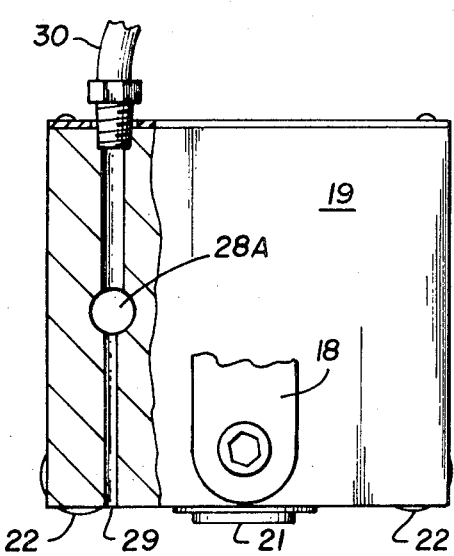
FIG. 5 is an end view of the transducer housing assembly of FIG. 3 and includes a partial sectional view.

As housing 19 is moved along the surface of an object being inspected it is necessary to inject an acoustical coupling medium, such as water or oil, onto the object to provide acoustical coupling between transducers 21 and the object inspected. As illustrated in FIGS. 3 and 5, a suitable manifold conduit 28 can be provided in housing 19 to provide for the injection of water from the housing onto the surface of the object being inspected in front of the transducers as inspection proceeds. For this purpose a series of jets or orifices 29 are connected to manifold 28, and manifold 28 is in turn connected through a hose 30 to a source (not shown) of coupling fluid.

An important feature of this invention is the provision of a self-contained transducer 21 which includes its own acoustical fluid injection system. The details of transducer 21 are shown in FIG. 2. In the preferred form of transducer, a cylindrical aluminum housing or shell 31 surrounds a cylindrical sleeve 32 which is made of cork or other material which provides good acoustical shielding. Sleeve 32 is used to ensure that the transducer elements are effectively acoustically shielded in the housing. The top of shell 31 is sealed by a plastic insert 33 through which electrical connecting lines 34 and 35 and a fluid conduit 36 pass. Also, plastic insert 33 provides a mounting base for spring 25.

The other end of the transducer 21 is sealed by insertion of two acoustical coupling blocks 37 and 38 into the opening in sleeve 32. Blocks 37 and 38 and insert 33 are spaced apart so that a chamber 39 is formed in the interior of transducer 21.

Acoustical coupling block 37 forms part of a transmitting section of transducer 21 and a transmitting transducer element, such as a piezoelectric crystal 40 is mounted thereon. Block 37 thus provides a structural member and provides acoustical coupling between crystal 40 and the exterior of transducer 21. Also, acoustical coupling block 38 forms part of a receiving section of transducer 21 and a receiving transducer element 41, which also may be a piezoelectric crystal is mounted thereon. Block 38 thus provides a structural member and provides acoustical coupling between crystal 41 and the exterior of transducer 21. Transmitting and receiving crystals 40 and 41 are mounted on their respective blocks at spaced apart lateral positions and separated by an acoustic shielding means which may be an insert member 42 extending between blocks 37 and 38. Member 42 is also preferably made of cork or other poor acoustical conducting material. Cork insert member 42 is also surrounded by a thin layer of an electrical conducting material 43 such as brass. Cables 35 and 34 are co-axial cables and the shields of each of these cables are connected to material 43 which is in turn connected through L-shaped members 44 and 45, also preferably made of brass, to one side of each of crystals 40 and 41. The The center conductor of cable 34 is connected to the other side of transmitting crystal 40, and the center conductor cable 35 is connected to the other side of the receiving crystal 41. A rubber filler, such as silastic 732RTV, a product of Dow Corning, is placed on top of the crystals and about material 43 to provide a fluid tight plug 46 which prevents acoustical coupling fluid from contaminating crystals 41 and 40 and holds the crystals in place.

A difficult problem in the construction of any ultrasonic transducer is to prevent acoustical coupling between the transmitting crystal and the receiving crystal, except by way of reflection back from an object being inspected. Although member 42 reduces acoustical coupling between crystals 40 and 41 appreciably, it further improves results to mount crystals 40 and 41 on their respective blocks 37 and 38, so that an air gap 47 is provided between each crystal and material 43 and to ensure that when the rubber filler is poured for plug 46 that the air gaps 47 are maintained. Since air is a poor conductor of acoustics, the air gap 47 increases the effective acoustical shielding between the transmitting section on one side of member 43 and the receiving sections of the transducer on the other side of material 43. Also, since the rubber used for plug 46 does conduct acoustics, the height of the acoustical shield 42 should be such that the arrival time of any acoustic waves coupled through plug 46 from the transmitting crystal 40 to receiver crystal 41 will not coincide with any of the echo signals which are to be detected. With the arrangement shown in FIG. 2, the echo signal will arrive at crystal 41 well before any signal coupled through plug 46.

Another problem in the construction of a suitable transducer for use in ultrasonic inspection systems is to provide good acoustical coupling properties in the transducer structure such as blocks 37 and 38, between the transducer elements and the exterior of the transducer. While materials, such as nylon, have been used which provide good acoustical coupling, these materials are temperature sensitive and any appreciable change in temperatures in the material will result in a change in the acoustical properties and in the necessity of changing calibration of the instruments used. A further feature of this invention is the use of an acoustic coupling material for blocks 37 and 38 which is insensitive to a broad range in temperatures, for example, 20° C., or more. For this purpose blocks 37 and 38 are made of a glass impregnated epoxy which provides the desired properties as well as good acoustical coupling. On tests made on a transducer using glass epoxy designated Nema Grade G-10, the variation in temperature of 20° C. around the transducer resulted in no appreciable change in the acoustical properties of the transducer.

In the transducer of FIG. 2, tubing 36 is connected to a source (not shown) of acoustical coupling fluid, such as water, to conduct this fluid to chamber 39. Also, a series of fluid orifices or jets 48 are provided in each of blocks 37 and 38 for conducting the acoustical coupling fluid from chamber 39 to the exterior of transducer 21 to provide a continuous and uniform film or layer of coupling fluid on the surface of the objet being inspected. The fluid emerging from orifices 48 also serves to clean the surface of object 11 which improves coupling. Also, the pressure of the fluid emerging from orifices 48 can be set to be of sufficient value to overcome the force of spring 25 so that the fluid can provide a fluid bearing, on which transducer 21 can ride, between transducer 21 and member 11. By proper adjustment of the fluid flow rate the thickness of the fluid bearing can be adjusted and can be maintained substantially constant, and this can be generally provided by increasing the flow rate of the fluid slightly beyond what is necessary to get good acoustical coupling. By use of such a fluid bearing the overall wear of the transducer components can be reduced and the effective life of the transducer increased. Also by utilization of the described fluid injection system in transducer 21, the transducer can be rapidly moved from one point to another while maintaining constant contact with the work-piece through a fluid coupling of constant thickness. If a layer of fluid of a certain thickness is desired, and the force provided by spring 25 is known, then the rate of flow of fluid necessary to provide the fluid bearing desired can be calculated by the formula:

$$Q = (F \rho g\, t^3) / (64\, \mu\, R^2)$$

Where
$Q$ = rate of flow required
$F$ = force of spring 25
$\rho$ = mass density of the fluid
$\mu$ = viscosity of the fluid
$t$ = desired thickness of the water film
$R$ = radius of the face of the film
$g$ = gravitational constant However, as noted, satisfactory results can be obtained by varying the flow rate of the fluid while observing the signals obtained from transducer 21.

From the foregoing it will be seen that this invention is one well adapted to attain all of the ends and objects hereinabove set forth, together with other advantages which are obvious and which are inherent to the apparatus.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. An ultrasonic inspection transducer apparatus for supporting a plurality of transducers in a housing assembly adapted to be rotated about the longitudinal axis of a tubular member being inspected, comprising, in combination: means for connecting said apparatus to a rotatable shaft extending substantially along said axis, said means including an arm connected at one end to such a shaft to permit said apparatus to follow the rotation of such a shaft; means for resiliently urging said apparatus with a first force toward the wall of such a member at all rotational positions of said apparatus; a transducer housing assembly mounted on the other end of said arm and including a plurality of ultrasonic transducers mounted therein for ultrasonically inspecting adjacent sections of such a tubular member; means for mounting each of said transducers to resiliently urge them toward the wall of such a member with a second force substantially less than said first-mentioned force, while permitting each transducer to have limited canting movement in substantially all directions; and means for injecting a fluid medium between each of said transducers and the wall of such a member to provide acoustical coupling therebetween.

2. The apparatus of claim 1 wherein said transducer housing assembly is pivotally mounted on said arm to permit said assembly to rotate about an axis substantially parallel to the wall being inspected.

3. The apparatus of claim 1 wherein said means for injecting said fluid medium includes a plurality of jets in said transducer housing assembly for discharging said fluid medium on such a member during inspection thereof in front of each of said transducers.

4. The apparatus of claim 1 wherein each of said transducers includes a housing; an ultrasonic transmitting transducer element mounted in a first section of said housing for directing ultrasonic energy into an object to be inspected; first coupling means in said first section providing acoustical coupling between said transmitting transducer element and the exterior of said transducer; an ultrasonic receiving transducer element mounted in a second section of said housing for receiving ultrasonic echos from such an object being inspected; second coupling means in said section providing acoustical coupling between said transducer receiving element and the exterior of said transducer; and acoustical shielding means mounted in said housing between said first and second sections to minimize acoustical coupling therebetween.

5. The apparatus of claim 4 wherein said first and second coupling means are blocks of glass impregnated epoxy extending from the interior of said housing to the exterior thereof, each of the transducer elements being mounted on one of said blocks.

6. The apparatus of claim 4 wherein said means for injecting said fluid medium includes a fluid chamber in said transducer housing; conduit means extending from said chamber for communication with a source of acoustical coupling fluid, and at least one fluid orifice communicating between said chamber and the exterior of said transducer to provide a fluid coupling film between the transducer and an object to be inspected.

7. The apparatus of claim 6 including a plurality of such fluid orifices each passing through one of said first and second coupling means to provide a substantially uniform film of fluid between said transducer and an object to be inspected.

8. A transducer housing assembly for supporting a plurality of ultrasonic inspection transducers adjacent an object being inspected, comprising in combination: a body; a plurality of transducer chambers in said body; an ultrasonic inspection transducer mounted in each chamber and extending from said body to the exterior thereof, the opening in each chamber through which each transducer passes being of sufficient size to provide a clearance between the transducer and said body; means resiliently urging each transducer outwardly from said body; and stop means on said body and on each of said transducers cooperating to prevent movement of each of said transducers out of said body, said stop means and said resilient means cooperating with said clearance to permit each transducer to have limited canting movement in substantially all directions, and wherein each of said transducers includes a housing, an ultrasonic transmitting transducer element mounted in a first section of said housing for directing ultrasonic energy into an object to be inspected, first coupling means in said first section providing acoustical coupling between said transmitting transducer element and the exterior of said transducer, an ultrasonic receiving transducer element mounted in a second section of said housing for receiving ultrasonic echoes from such an object being inspected, second coupling means in said section providing acoustical coupling between said transducer receiving element and the exterior of said transducer, and acoustical shielding means mounted in said housing between said first and second sections to minimize acoustical coupling therebetween.

9. The apparatus of claim 8 further including a plurality of jets in said transducer housing assembly for discharging a fluid medium on such a member during inspection thereof in front of each of said transducers.

10. The apparatus of claim 8 wherein said first and second coupling means are blocks of glass impregnated epoxy extending from the interior of said housing to the exterior thereof, each of the transducer elements being mounted on one of said blocks.

11. The apparatus of claim 8 further including a fluid chamber in said housing; conduit means extending from said chamber to a source of acoustical coupling fluid, and at least one fluid orifice communicating between said chamber and the exterior of said transducer to provide a fluid coupling film between the transducer and an object to be inspected.

12. The apparatus of claim 11 including a plurality of such fluid orifices each passing through one of said first and second coupling means to provide a substantially uniform film of fluid between said transducer and an object to be inspected.

13. The apparatus of claim 8 further including means preventing rotation of each of said transducers with respect to said body.

14. The apparatus of claim 8 wherein each of said transducers includes means for injecting an acoustical coupling fluid medium from such transducer toward such an object being inspected, with a force substantially equal to the resilient force urging such transducer outwardly from said body when such transducer is separated from the object being inspected by an effective layer of such fluid.

15. A transducer housing assembly for supporting a plurality of ultrasonic inspection transducers adjacent an object being inspected, comprising in combination: a body; a plurality of transducer chambers in said body; an ultrasonic inspection transducer mounted in each chamber and extending from said body to the exterior thereof, the opening in each chamber through which each transducer passes being of sufficient size to provide a clearance between the transducer and said body; means resiliently urging each transducer outwardly from said body; and stop means on said body and on each of said transducers cooperating to prevent movement of each of said transducers out of said body, said stop means and said resilient means cooperating with said clearance to permit each transducer to have limited canting movement in substantially all directions, and wherein each of said transducers includes means for injecting an acoustical coupling fluid medium from such transducer toward such an object being inspected, with a force substantially equal to the resilient force urging such transducer outwardly from said body when such transducer is separated from the object being inspected by an effective layer of such fluid.

* * * * *